Feb. 12, 1924. 1,483,657
A. R. GLIDDEN
CONTROLLING DEVICE FOR INTERNAL COMBUSTION ENGINES
Filed April 11, 1921
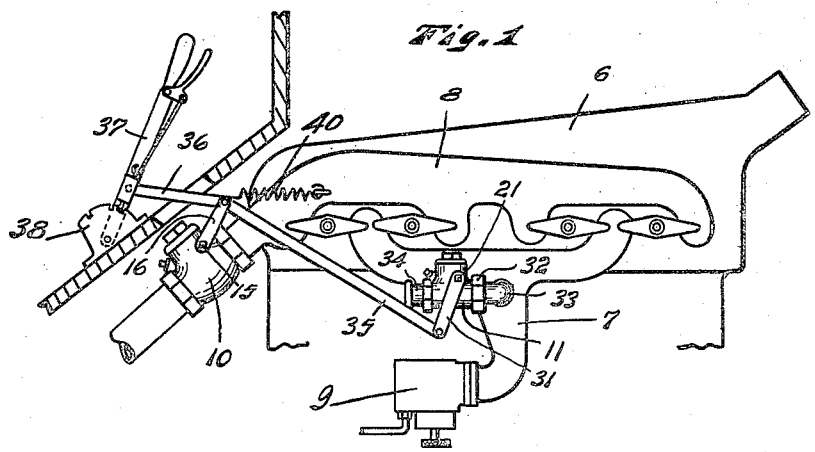
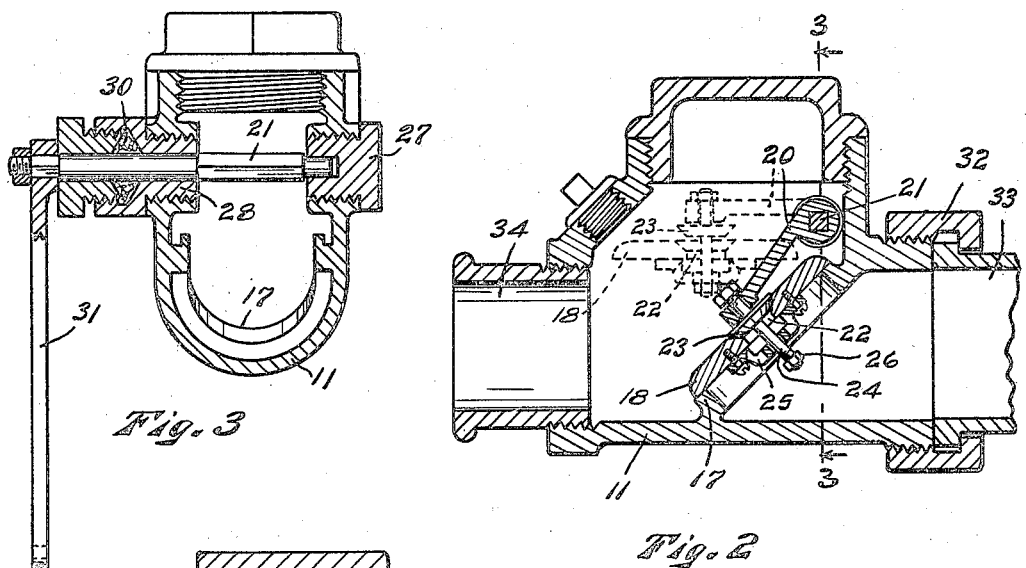
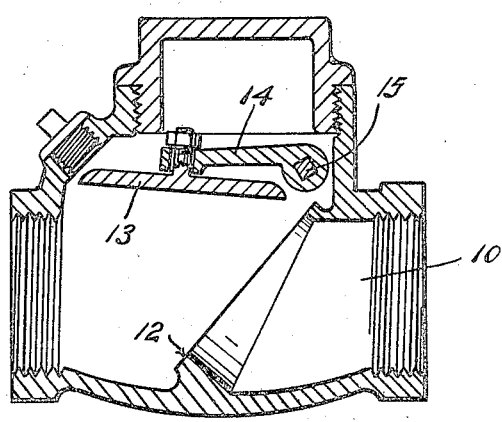
Inventor:
Arthur R. Glidden
Attorney
Pierre Garnes Patented Feb. 12, 1924.

1,483,657

UNITED STATES PATENT OFFICE.

ARTHUR R. GLIDDEN, OF SULTAN, WASHINGTON.

CONTROLLING DEVICE FOR INTERNAL-COMBUSTION ENGINES.

Application filed April 11, 1921. Serial No. 460,412.

*To all whom it may concern:*

Be it known that I, ARTHUR R. GLIDDEN, a citizen of the United States, residing at Sultan, in the county of Snohomish and State of Washington, have invented certain new and useful Improvements in Controlling Devices for Internal-Combustion Engines, of which the following is a specification.

This invention relates to improvements in means for increasing the retarding or brake effects of internal combustion engines and to improvements in means for preventing the waste of fuel in engines of automobiles when the latter are coasting.

An object of my invention is to provide valve controlled means for closing the exhaust passage of an engine for the purpose of increasing the compression within the cylinders and the provision of another valve controlled means whereby the fuel inlet conduit of the engine may be opened to the atmosphere for the admission of air with a temporary interference with the fuel supply.

Another object is to provide means for connecting the exhaust and air inlet valves in such a manner that the air inlet valve will be opened simultaneously with, or slightly in advance of, the closing of the exhaust valve.

A further object is to provide manually controlled means within the air inlet valve for admitting a small amount of auxiliary air to dilute the fuel charge and effect a saving of fuel under certain operating conditions of the engine.

The invention consists in the novel construction, arrangement and combinations of parts hereinafter described and claimed.

In the accompanying drawings, Figure 1 is a view in side elevation showing this invention applied to an automobile engine; Figure 2 is a longitudinal section of the air inlet valve; Figure 3 is a vertical section substantially on a broken line 3—3 of Figure 2, parts being shown in elevation and other parts being omitted; and Figure 4 is a longitudinal section of the valve for the engine exhaust pipe.

Like reference numerals designate like parts throughout the several views:

Referring to the drawings, the numeral 6 designates, generally, an internal combustion engine provided with a fuel inlet manifold 7 and an exhaust manifold 8, said inlet manifold being connected with a carburetor 9.

According to the present invention there are provided two valve 10 and 11, one of which is connected in the exhaust manifold in such a manner as to serve as a shut-off valve therefor, and the other valve is connected with the fuel inlet manifold in such a manner as to open a communication between the atmosphere and the interior of the fuel inlet manifold, the two valves being connected with suitable means whereby they may be operated simultaneously.

The valve 10 for the exhaust manifold is in the nature of a check or non-return valve, see Figure 4, having a seat 12 for the valve member 13 which is connected by an arm 14 with a transverse spindle 15 having at one end thereof an arm 16.

The valve casing 11 for the inlet manifold is also of the check or non-return type and is provided with a seat 17 for the valve member 18. This valve member 18 is connected by an arm 20 with a transverse spindle 21 by which it may be moved from its closed position, shown by full lines in Fig. 2, to the open position shown by broken lines.

The valve member 18 is in the form of a disk and is provided with a centrally arranged opening 22 in which is a seat for a relatively small valve 23 which is secured to a stem 24 which extends through an aperture provided in arm 20. As shown, the stem 24 is guided within a bracket or spider 25 that is secured to the disk 18.

The valve stem 24 serves to connect the large valve disk 18 with the arm 20 so that when the arm is raised it will successively open the small valve 23 and then swing the same together with large valve 18 into the positions in which they are represented by broken lines in Fig. 2. The amount that the small valve 23 is permitted to open before the large valve 18 will be moved is regulated by an adjustably movable nut 26 on the end of the stem 24 and with respect to the spider 25.

The spindle 21 is mounted for rotation preferably in screw threaded fittings 27 and 28 engaging in opposite sides of the valve casing 11. Said spindle extends through packing 30 in a stuffing box provided at the outer end of the fitting 28. 31 represents an arm rigidly secured to the spindle 21. The fittings 27 and 28 are preferably interchangeable so that the valve spindle 21 may be reversibly employed to adapt the arm 31 to be used at either side of the valve casing.

The valve casing 11 is desirably connected by a union nut 32 with an elbow fitting 33 which engages in an aperture of the inlet manifold 7.

At the outer end of the valve casing 11 is provided a nipple 34 to which may be secured a hose, not shown, for connecting the same with a suitable air heater for use in cold weather.

A coupling bar 35 is pivotally connected to the valve controlling arms 16 and 31 and the arm 16 furthermore is connected by a link 36 with an operating lever 37. This operating lever is located within convenient reach of the driver of the vehicle on which the apparatus is employed and, as shown, is fulcrumed to a notched segment stand 38.

40 represents a spring connected to the arm 16 and serves to yieldingly retain the inlet and exhaust valves in their closed and open positions respectively.

The lever 37 may be manipulated to effect the opening movement of the small valve 23 without closing the exhaust valve 13 far enough to interfere with the outlet of exhaust gases.

Under ordinary conditions the exhaust valve is in its wide open position and the air inlet valve is tightly closed upon its seat, thus enabling the engine to operate for driving an automobile in the usual manner. If it is desired, however, to use the engine for retarding the speed of the vehicle, the operating lever is utilized to cause the exhaust valve to close with the opening of the air inlet valve.

Under such conditions the exhaust valve 10 acts to prevent the escape of compressed air from the engine cylinder and whereupon the air confined in the cylinders exercises a retarding or brake effect through the medium of the power transmission mechanism which is associated with the engine.

The opening of the inlet valve 11 admits atmospheric air to the engine instead of an explosive mixture of air and fuel.

The small valve 23 is opened prior to the opening of the valve 18 and may thereby be made to serve as an auxiliary air inlet to dilute the fuel charges.

It is to be noted that the air inlet valve 11 is arranged so that the suction in the fuel inlet manifold tends to close it, while the exhaust valve 10 is arranged so that the discharge of gases from the exhaust manifold acts to keep the valve in its open position.

It will also be understood that changes in the form, dimensions and arrangement of parts of this device may be made within the scope of the following claims.

What I claim, is:—

1. An internal combustion engine having in its intake manifold an air inlet located between the carburetor and the engine cylinders, a normally closed compound valve provided for said inlet, a normally open valve provided for the exhaust manifold of the engine, and means whereby said inlet and exhaust valves are respectively moved in unison into their open and closed position said means operating to permit operation of a portion of the compound valve prior to effective operation of the exhaust valve.

2. An internal combustion engine having a fuel inlet conduit and an exhaust conduit, a shut off valve for said exhaust conduit, a compound valve for opening said fuel inlet conduit to the atmosphere, and mechanism for operating said valves simultaneously and operating to permit operation of a portion of the compound valve prior to effective operation of the exhaust valve.

3. An internal combustion engine having a fuel inlet conduit and an exhaust conduit, a shut off valve for said exhaust conduit, a compound valve affording communication from said fuel inlet conduit to the atmosphere, and manually operated means connected to said valves for simultaneously opening one of the valves with the closing of the other valve the opening movement of one of the valves permitting operation prior to effective operation of the closing movement of the other valve.

Signed at Seattle, Washington, this 5th day of April, 1921.

ARTHUR R. GLIDDEN.

Witnesses:
PIERRE BARNES,
MARGARET G. SUPPLE.